United States Patent
Purdy et al.

(10) Patent No.: US 12,276,067 B2
(45) Date of Patent: Apr. 15, 2025

(54) MODIFIED ALKANESULFONIC ACID AND USES THEREOF

(71) Applicant: SixRing Inc., Calgary (CA)

(72) Inventors: Clay Purdy, Medicine Hat (CA); Markus Weissenberger, Calgary (CA); Kyle G. Wynnyk, Calgary (CA); Karl W. Dawson, Calgary (CA)

(73) Assignee: SIXRING INC., Calgary (CA)

( * ) Notice: Subject to any disclaimer, the term of this patent is extended or adjusted under 35 U.S.C. 154(b) by 675 days.

(21) Appl. No.: 17/187,354

(22) Filed: Feb. 26, 2021

(65) Prior Publication Data

US 2021/0269971 A1 Sep. 2, 2021

(30) Foreign Application Priority Data

Feb. 28, 2020 (CA) ..................... 3074198

(51) Int. Cl.
*D21C 3/06* (2006.01)
*C01B 15/08* (2006.01)
*D21C 1/04* (2006.01)
*D21C 3/00* (2006.01)

(52) U.S. Cl.
CPC ............... *D21C 3/06* (2013.01); *C01B 15/08* (2013.01); *D21C 3/006* (2013.01)

(58) Field of Classification Search
CPC . D21C 3/06; D21C 3/006; D21C 1/04; D21C 9/16; C01B 15/08; C01B 17/69; Y02W 30/64
See application file for complete search history.

(56) References Cited

U.S. PATENT DOCUMENTS

| | | | |
|---|---|---|---|
| 2,855,351 A | 10/1958 | Ermst | |
| 3,509,206 A * | 4/1970 | Nielsen | C07C 407/00 562/6 |
| 3,655,738 A * | 4/1972 | Nielsen | C07C 409/30 562/6 |
| 4,626,319 A | 12/1986 | Kruger et al. | |
| 4,704,404 A * | 11/1987 | Sanderson | A01N 41/04 562/2 |
| 4,756,845 A | 7/1988 | Sugawara et al. | |
| 4,935,499 A | 6/1990 | Ruske et al. | |

(Continued)

FOREIGN PATENT DOCUMENTS

| | | |
|---|---|---|
| CA | 2134270 C | 7/2005 |
| CA | 2744569 A1 | 6/2010 |

(Continued)

OTHER PUBLICATIONS

CN 109898085 A, English language Abstract (Year: 2019).*

(Continued)

*Primary Examiner* — Joseph D Anthony
(74) *Attorney, Agent, or Firm* — Blank Rome LLP

(57) ABSTRACT

Method of delignification of plant material, said method comprising: providing said plant material comprising cellulose fibers and lignin; exposing said plant material requiring to a composition comprising: alkanesulfonic acid; and a peroxide, wherein said alkylsulfonic acid and peroxide are present in a molar ratio ranging 1:1 to 15:1 and the time of exposure is sufficient to remove substantially all of the lignin present on said plant material. Compositions capable of achieving delignification are also disclosed.

14 Claims, 1 Drawing Sheet

(Elapsed time $t = 1$ min (MSA-$H_2O_2$))

(56) References Cited

U.S. PATENT DOCUMENTS

| | | | |
|---|---|---|---|
| 5,080,756 A | 1/1992 | Kutney | |
| 5,691,193 A | 11/1997 | Paice et al. | |
| 5,955,050 A | 9/1999 | Drexler | |
| 9,499,405 B2 | 11/2016 | Dindi | |
| 9,890,321 B2 | 2/2018 | Shumway | |
| 11,760,720 B2 | 9/2023 | Purdy et al. | |
| 11,846,067 B2 | 12/2023 | Purdy et al. | |
| 2003/0224960 A1 | 12/2003 | Scialla et al. | |
| 2004/0099637 A1* | 5/2004 | Johnson | H05K 3/383 216/83 |
| 2010/0291722 A1* | 11/2010 | Kim | C23F 1/26 252/79.3 |
| 2012/0217500 A1* | 8/2012 | Park | H01L 29/78669 257/E33.053 |
| 2013/0122701 A1* | 5/2013 | Krupa | C23F 1/28 148/22 |
| 2013/0156631 A1 | 6/2013 | Kumagai et al. | |
| 2014/0113843 A1 | 4/2014 | Shumway | |
| 2014/0121145 A1* | 5/2014 | Paasche | H05K 3/067 205/291 |
| 2014/0349359 A1* | 11/2014 | Fernholz | C12P 7/10 514/557 |
| 2016/0021888 A1 | 1/2016 | Burke et al. | |
| 2016/0074549 A1 | 3/2016 | Lei et al. | |
| 2016/0264420 A1 | 9/2016 | Dindi | |
| 2016/0298294 A1 | 10/2016 | Dietz et al. | |
| 2016/0304989 A1* | 10/2016 | Pujari | C22B 25/06 |
| 2020/0010959 A1* | 1/2020 | Hong | H01L 21/30617 |

FOREIGN PATENT DOCUMENTS

| | | |
|---|---|---|
| CA | 2923100 A1 | 9/2016 |
| CA | 2889135 C | 1/2018 |
| CN | 103572306 A | 2/2014 |
| CN | 103820796 A | 5/2014 |
| CN | 104040061 A | 9/2014 |
| CN | 109761380 A | 5/2019 |
| CN | 109877097 A | 6/2019 |
| CN | 109898085 A * | 6/2019 |
| CN | 110485188 A | 11/2020 |
| EP | 0199385 A2 | 10/1986 |
| EP | 0779357 A1 | 6/1997 |
| JP | H07206804 A | 8/1995 |
| JP | 2010285697 A | 12/2010 |
| KR | 1920150114655 | 10/2015 |
| RU | 2634586 C1 | 10/2017 |
| WO | 9612673 A1 | 5/1996 |
| WO | 2010106182 A1 | 9/2010 |
| WO | 2014065972 A1 | 5/2014 |
| WO | 2019055789 A1 | 3/2019 |

OTHER PUBLICATIONS

CN 109628934 A, English language Abstract (Year: 2019).*
CN 108069519 A, English Language Abstract (year 2018).*
CN 108468050 A, English Language Abstract (2018).*
Rackemann et al., 2016 "The effect of pretreatment on methanesulfonic acid-catalyzed hydrolysis of bagasse to levulinic acid, formic acid, and furfural," RSC Advances 6(78):74525-35.
International Search Report from related Application No. PCT/CA2021/000018, mailed Jul. 5, 2021 (3 pages).
U.S. Appl. No. 17/187,122, filed Feb. 26, 2021 (24 pages).
U.S. Appl. No. 17/187,247, filed Feb. 26, 2021 (16 pages).

* cited by examiner (Elapsed time $t$ = 1 min (MSA-$H_2O_2$))

(Elapsed time $t$ = 60 min (MSA-$H_2O_2$))

(Elapsed time $t$ = 1 day (MSA-$H_2O_2$))

(Elapsed time $t$ = 8 days (MSA-$H_2O_2$))

MODIFIED ALKANESULFONIC ACID AND USES THEREOF

1. FIELD OF THE INVENTION

The present invention is directed to a method and composition useful in decomposing organic material such as biomass by oxidation such as, but not limited to, the delignification of wood substance as a broad example and more specifically, to a method and composition for performing such under milder conditions than those under which the kraft process is conducted.

2. BACKGROUND OF THE INVENTION

The first step in paper production and most energy-intensive one is the production of pulp. Notwithstanding water, wood and other plant materials used to make pulp contain three main components: cellulose fibers; lignin; and hemicelluloses. Pulping has a primary goal to separate the fibers from the lignin. Lignin is a three-dimensional polymer which figuratively acts as a mortar to hold all the fibers together within the plant. Its presence in finished pulp is undesirable and adds nothing to the finished product. Pulping wood refers to breaking down the bulk structure of the fiber source, be it chips, stems or other plant parts, into the constituent fibers. The cellulose fibers are the most desired component when papermaking is involved. Hemicellulose is a shorter branched carbohydrate polymer consisting of various sugar monomers which form a random amorphous polymeric structure. The presence of hemicellulose in finished pulp is not as critical to paper rigidity as cellulose is. This is also true for biomass conversion. The challenges are similar. Only the desired outcome is different. Biomass conversion would have the further breakdown to monocarbohydrates as a desired outcome while a pulp & paper process normally stops right after lignin dissolution.

There are two main approaches to preparing wood pulp or woody biomass: mechanical treatment and chemical treatment. Mechanical treatment or pulping generally consists of physically tearing the wood chips apart and, thus, tearing cellulose fibers apart in an effort to separate them from each other. The shortcomings of this approach include: broken or damaged cellulose fibers, thus shorter fibers; and lignin contamination or residue on the cellulose fibers, thus introducing or leaving behind impurities of the final product. This process also consumes large amounts of energy and is capital intensive due to the high pressure, corrosive chemicals and heat required. There are several approaches or processes included in chemical pulping. These are generally focused on the degradation the lignin and hemicellulose into, water-soluble molecules. These now degraded components are separated from the cellulose fibers by washing the latter without damaging the cellulose fibers. The chemical process is currently energy intensive as well, as high amounts of heat are typically required; and, in many cases, also require agitation or mechanical intervention adding inefficiencies and costs to the process.

There exist pulping methods which combine to various extent the chemical aspects of pulping with the mechanical aspects of pulping. To name a few, one must consider include thermomechanical pulping (also commonly referred to as TMP), and chemithermomechanical pulping (CTMP). Through a selection of the advantages provided by each general pulping method, the treatments are designed to reduce the amount of energy required by the mechanical side of the pulping treatment. This can also directly impact the strength loss of the fibers subjected to these combined pulping approaches. Generally, these approaches involve a shortened chemical treatment (compared to conventional chemical pulping) which is followed by mechanical treatment to separate the fibers.

The most common process to make pulp for paper production is the kraft process. In the kraft process, wood chips are converted to wood pulp which is almost entirely pure cellulose fibers. The multi-step kraft process consists of a first step where wood chips are impregnated with a chemical solution. This is done by wetting wood chips and pre-heating them with steam. This swells the wood chips and expels the air present in them and replaces the air with the liquid. Then the chips are saturated with a black liquor and a white liquor. The black liquor is a resulting product from the kraft process. It contains water, lignin residues, hemicellulose and inorganic chemicals. White liquor is a strong alkaline solution comprising sodium hydroxide and sodium sulfide. Once the wood chips have been soaked in the different solutions, they undergo cooking. To achieve delignification in the wood chips, the cooking is carried out for a few hours at temperatures reaching up to 176° C. At these temperatures, the lignin degrades to yield water soluble fragments. The remaining cellulosic fibers are collected and washed after the cooking step.

Caro's acid, also known as peroxymonosulfuric acid ($H_2SO_5$), is one of the strongest oxidants known. There are several known reactions for the preparation of Caro's acid but one of the most straightforward involves the reaction between sulfuric acid ($H_2SO_4$) and hydrogen peroxide ($H_2O_2$). Preparing Caro's acid in this method allows one yield in a further reaction potassium monopersulfate (PMPS) which is a valuable bleaching agent and oxidizer. While Caro's acid has several known useful applications, one noteworthy is its use in the delignification of wood.

U.S. Pat. No. 5,080,756 teaches an improved kraft pulping process is characterized by the addition of a spent concentrated sulfuric acid composition containing organic matter to a kraft recovery system to provide a mixture enriched in its total sulfur content that is subjected to dehydration, pyrolysis and reduction in a recovery furnace. The organic matter of the sulfuric acid composition is particularly beneficial as a source of thermal energy that enables high heat levels to be easily maintained to facilitate the oxidation and reduction reactions that take place in the furnace, thus resulting in the formation of sulfide used for the preparation of cooking liquor suitable for pulping.

Rackemann et al. in "The effect of pretreatment on Methanesulfonic acid-catalyzed hydrolysis of bagasse to levulinic acid, formic acid and furfural" (2018) discloses the use of methanesulfonic acid on bagasse pretreated with an alkaline solution.

US patent application number 2016/0074549 discloses activated hydrogen peroxide disinfecting compositions for low-foaming applications. A concentrate for dilution by an end-user is provided, which includes a hydrogen peroxide source, a non-surfactant organic sulfonic acid or salt thereof, a non-ionic surfactant, and an optional organic acid. Also provided is a ready-to-use hydrogen peroxide, disinfectant solution including a biocidal amount of hydrogen peroxide, a non-surfactant organic sulfonic acid or salt thereof, a non-ionic surfactant, water as solvent and an optional organic acid. An end-user can disinfect a surface of microorganisms by contacting the surface with the disinfecting composition for an amount of time effective to kill a majority of the microbes located on the surface.

Biofuel production is another potential application for the kraft process. One of the current drawbacks of biofuel production is that it requires the use of food grade plant parts (such as seeds) in order to transform carbohydrates into fuel in a reasonably efficient process. The carbohydrates could be obtained from cellulosic fibers, by using non-food grade biomass in the kraft process, however, the energy intensive nature of the kraft process for delignification makes this a less commercially viable option. In order to build a plant based chemical resource cycle there is a great need for energy efficient processes which can utilize plant-based feedstocks that don't compete with human food production.

While the kraft pulping process is the most widely used chemical pulping process in the world, it is extremely energy intensive and has other drawbacks, for example, substantial odours emitted around pulp producing plants.

In light of the current environmental challenges and climactic changes occurring because of man-made pollution, it is desirable to be able to perform organic material decomposition by mild oxidation. This would update the pulping technology to provide good quality fibers without substantial detriment to the environment during the production thereof. Accordingly, there still exists a need for a composition capable of performing delignification on wood substance under moderate temperature and pressure.

3. SUMMARY OF THE INVENTION

According to an aspect of the present invention, there is provided an aqueous acidic composition, said composition comprising:
    an alkylsulfonic acid; and
    a peroxide;
wherein said alkylsulfonic acid and peroxide are present in a molar ratio ranging from 1:1 to 15:1.

The inventors have discovered that delignification of organic material such as wood material (such as, but not limited to, chips or sawdust) can occur at substantially lower temperatures than those used during conventional kraft pulping. In fact, experiments conducted at room temperature with preferred compositions according to the present invention were shown to degrade the lignin present in wood chips to yield high quality cellulose fibers. According to a preferred embodiment of a method according to the present invention, a wood sample was treated at 30° C. upon exposure to a composition according to a preferred embodiment of the present invention. According to a preferred embodiment of the present invention, one could substantially reduce the energy costs involved in pulp delignification by applying a method involving a preferred composition of the present invention.

By reducing the energy requirements and thus capital costs in the pulping process, these teachings would make the pulping process less environmentally polluting by burning less fossil fuel or organic matter to generate the necessary heat required in the conventional pulping process. It would also retain much of the valuable constituents in biomass that are typically degraded or destroyed during the Kraft process, such as aromatic monomers. The technology disclosed herein represents a substantial advancement both in terms of environmental focus but also as a method to generate chemical compounds used as building blocks or starting materials in a number of industrial chemical processes.

According to an aspect of the present invention, there is provided an aqueous acidic composition comprising:
    an alkylsulfonic acid; and
    a peroxide;
wherein the acid is present in an amount ranging from 20-65 wt % of the total weight of the composition and where the peroxide is present in an amount ranging from 1-30 wt % of the total weight of the composition.

According to another aspect of the present invention, there is provided an aqueous acidic composition comprising:
    an alkylsulfonic acid; and
    a peroxide;
wherein said alkylsulfonic acid; and said peroxide are present in a molar ratio of no less than 1:1.

Preferably, the composition further comprises a compound comprising an amine moiety.

Preferably, said alkylsulfonic acid is selected from the group consisting of: alkylsulfonic acids where the alkyl groups range from C1-C6 and are linear or branched; and combinations thereof.

Preferably, said alkylsulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof. More preferably, said alkylsulfonic acid is methanesulfonic acid.

According to yet another aspect of the present invention, there is provided an aqueous composition for use in the delignification of biomass/wood, wherein said composition comprises:
    alkylsulfonic acid; and
    a peroxide,
wherein said alkylsulfonic acid and peroxide are present in a molar ratio ranging from 1:1 to 15:1.

Preferably, the peroxide is hydrogen peroxide.

According to another aspect of the present invention, there is provided a method of delignification of biomass/plant material, said method comprising:
    providing said plant material comprising cellulose fibers and lignin;
    exposing said plant material requiring to a composition comprising:
    alkanesulfonic acid; and
    a peroxide,
wherein said alkanesulfonic acid and peroxide are present in a molar ratio ranging from 1:1 to 15:1 and the time of exposure is sufficient to remove substantially all of the lignin present on said plant material.

Preferably, the composition further comprises a compound comprising an amine moiety. Preferably, the compound comprising an amine moiety has a molecular weight below 300 g/mol. Preferably also, the compound comprising an amine moiety is a primary amine. More preferably, the compound comprising an amine moiety is an alkanolamine. Preferably, the compound comprising an amine moiety is a tertiary amine.

According to a preferred embodiment of the present invention, the alkanolamine is selected from the group consisting of: monoethanolamine; diethanolamine; triethanolamine; and combinations thereof. Preferably, the alkanolamine is triethanolamine.

The inventors have discovered that delignification of wood material (such as, but not limited to wood chips or other common biomass) can occur at substantially lower temperatures than those used during conventional kraft pulping. In fact, some experiments were conducted at average room temperatures in the range of 18-21° C. with the preferred compositions and according to the present invention were shown to degrade the lignin present on wood chips to free up cellulose fibers very efficiently. According to another preferred embodiment of a method according to the present invention, a wood sample was dissolved at 30° C. upon exposure to a composition according to a preferred embodiment of the present invention. According to a preferred embodiment of the present invention, one could substantially reduce the energy costs, capital costs involved, and greatly reduce the associated emissions currently emitted in pulp delignification by applying a method involving a preferred composition of the present invention.

According to a preferred embodiment of the present invention, there is provided a multi-step process depending on time and temperature and molar ratios of a preferred composition of the present invention, wherein separate steps of dissolution achieve:
1. Delignification;
2. Dissolution of hemicellulose; and
3. Dissolution of crystalline cellulose.

4. BRIEF DESCRIPTION OF THE FIGURES

The invention may be more completely understood in consideration of the following description of various embodiments of the invention in connection with the accompanying figures, in which.

5. DETAILED DESCRIPTION OF THE PREFERRED EMBODIMENTS

Figure 1:
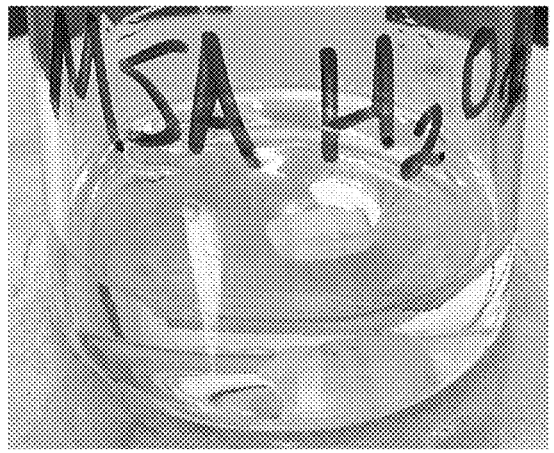
FIG. 1 is a picture of a wood chip in a composition according to a preferred embodiment of the present invention at t=1 minute.

It will be appreciated that numerous specific details have provided for a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered so that it may limit the scope of the embodiments described herein in any way, but rather as merely describing the implementation of the various embodiments described herein.

According to a preferred embodiment of the present invention, there is provided an acidic composition comprising an alkylsulfonic acid component and a peroxide component. When this composition is put in contact with biomass such as a wood chips, it delignifies the wood chips and leaves the cellulose and hemicellulose intact. Treatment as the one described above can prove advantageous when preparing pulp from organic material. Separation of the lignin material from both the cellulosic and hemicellulosic material provides for easier processing down the line to recuperate lignin monomers and other components. By lignin monomers one will understand that those are chemicals which were part of the lignin structure prior to the material having undergone acid hydrolysis.

According to a preferred embodiment of the present invention, there is provided a method to process organic material to obtain pulp and/or cellulosic material, wherein said method comprises the steps of:
providing an organic material comprising cellulose and lignin;
providing an acidic composition comprising an alkylsulfonic acid component and a peroxide component;
contacting said organic material with said composition for a period of time sufficient to remove substantially all of the lignin from said organic material; and
optionally, separating the lignin from the cellulose.

According to a preferred embodiment of the present invention, the remaining cellulose material can be further processed to ultimately obtain glucose monomers. Preferably, this processing step is performed using sulfuric acid or a modified acid comprising a sulfuric acid component.

Preferably, the processing of the delignified organic material comprises an intermediate step where the hemicellulose is separated from the cellulose and subsequently removed from the remaining cellulose. The now-separated hemicellulose may be further processed to yield a variety of chemical compounds for future use. The remaining cellulose can be further broken down by acid hydrolysis to yield glucose monomers. The glucose obtained can then be used as a starting block in a variety of industrial chemical processes.

According to a preferred embodiment of the method according to the present invention, the lignin recovered does not require substantial processing to further separate it from hemicellulose and/or cellulose as the method is quite selective. Preferably carrying out the method under proper control thereof greatly facilitates further lignin processing prior to its application into other fields. Lignin has a multitude of fields of application, such as: oil & gas well drilling additives; agricultural chemicals; specialty polymers; as well as its most common use as a fuel source. In fact, the application of lignin and its derivatives in various industries is now a multi-billion-dollar market, and improving the supply chain while reducing its processing requirements for future use would be highly advantageous.

The experiments carried out using an aqueous acidic composition according to a preferred embodiment of the present invention has shown that wood chips can be delignified under controlled reaction conditions and eliminate or at least substantially minimize the degradation of the cellulose. Degradation is understood to mean a darkening of cellulose or carbonization (conversion to carbon black) which is symbolic of an uncontrolled acid attack on the cellulose and staining thereof.

6. EXAMPLES

A preferred embodiment of the composition according to the present invention was tested to determine its power to delignify a wood chip.

Figure 2:
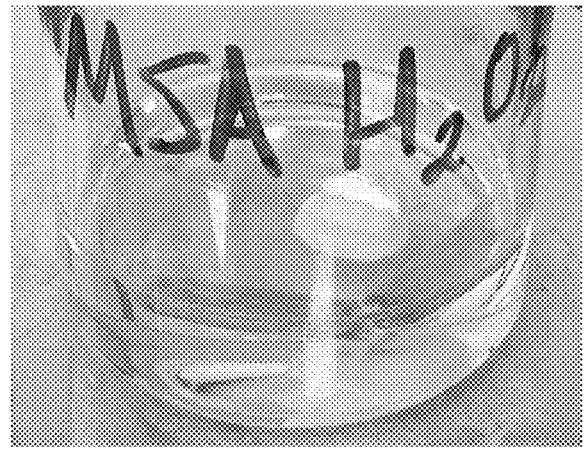
FIG. 2 is a picture of a wood chip in a composition according to a preferred embodiment of the present invention at t=60 minutes.
Figure 3:
FIG. 3 is a picture of a wood chip in a composition according to a preferred embodiment of the present invention at t=1 day.
Figure 4:
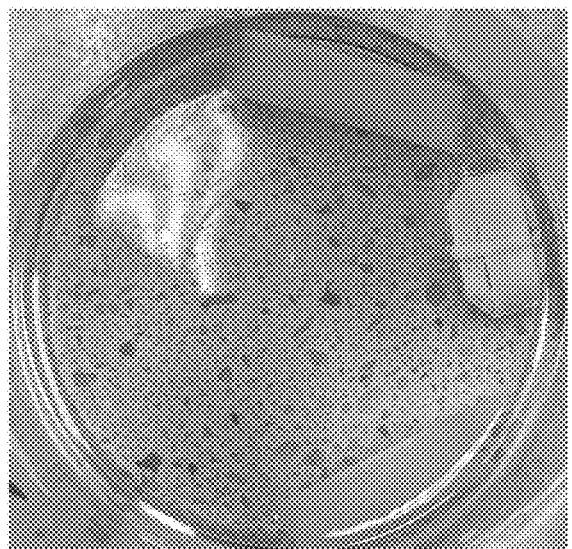
FIG. 4 is a picture of a wood chip in a composition according to a preferred embodiment of the present invention at t=8 days.

The experiments were completed using approximately 0.2 g of wood and approximately 20 g of solution. The mixtures were stirred at 200 rpm at a temperature of 30° C. for one hour (FIGS. 1 and 2). FIGS. 3 and 4 show the wood chips in solution over time. The solution tested comprised methanesulfonic acid and hydrogen peroxide in a concentration of 5.6 to 1. Titration of the resulting composition was done using permanganate and the results are tabulate in Table 1 below.

TABLE 1

Titration of the composition of Example 1

| Time | MSA-$H_2O_2$ (% yield of $H_2O_2$) |
| --- | --- |
| Upon synthesis (mixing) | 100 |
| After 4 days | 97.6 |
| After 7 days | 95.8 |

The pH recorded value was −0.45 at ambient conditions (pH<0). The molar ratio of MSA to peroxide was 5.6:1.

According to a preferred embodiment of the present invention, methanesulfonic acid is the main component in terms of volume and weight percent of the composition of the present invention. According to a preferred embodiment of the present invention, the pH of the composition is less than 1. According to another preferred embodiment of the present invention, the pH of the composition is less than 0.5.

FIGS. 3 and 4 show the delignification of a wood chip in the presence of an alkylsulfonic acid (methanesulfonic acid) and hydrogen peroxide over a period of time of up to 8 days at a temperature of approximately 22° C. It is noteworthy to point out that at the end of the experiment (day 8) there are no signs of carbon black. This is an indication that there was no degradation of cellulosic material to its most basic building block.

The above experiment is a clear indication that the composition according to the present invention not only provides an adequate dissolving acid to delignify plant material, but is also valuable in limiting the degradation of cellulosic material into carbon black residue, resulting in higher yields for plant operators and increased profitability while reducing emissions and risks to employees, contractors, and the public.

A method to yield glucose from wood pulp would represent a significant advancement to the current process where the conversion of such is chemically, energy and emissions intensive; costly; and dangerous while not yielding highly efficient results, especially in large-scale operations. It is desirable to employ a composition which may delignify wood but also allows the operator some control in order to preserve the cellulose rather than degrading it to carbon black, in order to improve efficiency and yields, increase safety, and reduce overall costs.

Preferably, the alkylsulfonic acid compound and the hydrogen peroxide are present in an amount ranging from 1:1 to 15:1 molar ratio. Preferably, the resulting pH of the composition is less than 1. More preferably, the resulting pH of the composition is less than 0.5.

According to a preferred embodiment of the present invention, the compound comprising a sulfonic acid moiety is selected from the group consisting of: alkylsulfonic acids where the alkyl groups range from C1-C6 and are linear or branched; and combinations thereof. Preferably, said compound comprising a sulfonic acid moiety is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof. More preferably, said compound comprising a sulfonic acid moiety is methanesulfonic acid.

As understood by the person skilled in the art, alkylsulfonic acid is understood to encompass alkylsulfonic acid compounds, where the alkyl is saturated or unsaturated, cyclic, straight or branched and/or substituted or unsubstituted.

According to a preferred embodiment of the present invention, the combination of a high concentration of an alkylsulfonic acid and a peroxide yields a modified acid composition capable of providing controlled delignification of an organic material and leave the cellulosic fibers relatively unaffected.

When performing delignification of wood using a composition according to a preferred embodiment of the present invention, the process can be carried out at substantially lower temperatures and pressures than those currently used in the conventional kraft pulping process. The advantages are substantial, here are a few: the Kraft pulping process requires temperatures in the vicinity of 176-180° C. in order to perform the delignification process, a preferred embodiment of the process according to the present invention can delignify wood at temperatures as low as 25° C. According to a preferred embodiment of the present invention, the delignification of wood can be performed at temperatures as low as 10° C. According to a preferred embodiment of the present invention, the delignification of wood can be performed at temperatures as low as 0° C. According to a preferred embodiment of the present invention, the delignification of wood can be performed at temperatures as low as 20° C. According to a preferred embodiment of the present invention, the delignification of wood can be performed at temperatures as low as 30° C. According to another preferred embodiment of the present invention, the delignification of wood can be performed at temperatures as low as 40° C. According to yet another preferred embodiment of the present invention, the delignification of wood can be performed at temperatures as low as 50° C. According to yet another preferred embodiment of the present invention, the delignification of wood can be performed at temperatures as low as 60° C. According to yet another preferred embodiment of the present invention, the delignification of wood can be performed at temperatures as low as 80° C. According to yet another preferred embodiment of the present invention, the delignification of wood can be performed at temperatures as low as 90° C. According to yet another preferred embodiment of the present invention, the delignification of wood can be performed at temperatures as low as 100° C. According to yet another preferred embodiment of the present invention, the delignification of wood can be performed at temperatures as low as 120° C. According to yet another preferred embodiment of the present invention, the delignification of wood can be performed at temperatures as low as 130° C.

In each one of the above preferred embodiments, the temperature at which the processes are carried out are substantially lower than the current energy-intensive and comparatively inefficient kraft process.

Moreover, the kraft process requires high pressures to perform the delignification of wood. According to a preferred embodiment of the present invention, the delignification of wood can be performed at atmospheric pressure. This, in turn, circumvents the need for highly specialized and expensive industrial equipment. It also allows the implementation of delignification units in many of parts of the world where the implementation of a pulp and paper facility would previously be impracticable due to a variety of reasons.

Some of the advantages of a process according to a preferred embodiment of the present invention, over a conventional kraft process are substantial as the heat inputted into the latter is not only a great source of pollution but is in large part the reason the resulting pulp is so pricey. The energy savings alone from the implementation of a process according to a preferred embodiment of the present invention would be reflected in a lower price pulp and environmental benefits both of which would have an immediate impact and a multi-generational commercial and environmental benefit.

Further cost savings from the implementation of a process according to a preferred embodiment of the present invention, can be found in the absence or minimization of restrictive regulations for the operation of a high temperature and high-pressure pulp cookers.

A method to yield glucose from wood pulp would represent a significant advancement to the current processes, where conversion of such is chemical intensive and costly and does not result in noteworthy results, especially in large-scale operations. It is desirable to employ a composition which would delignify biomass, but also allows the operator some control in order to preserve the cellulose rather than degrading it to carbon black. Providing additional revenue streams for the operators of such facilities.

According to a preferred embodiment of the method of the present invention, the separation of lignin can be effected and the resulting cellulose fibers can be further processed to yield glucose monomers. Glucose chemistry has a multitude of uses including as a precursor in the preparation of widely utilized chemicals including, but not limited, to diacetonide, dithioacetal, ethanol, glucoside, glucal and hydroxyglucal to name but a few.

Another advantage of using a preferred composition according to the present invention, in comparison to current kraft pulping, is the absence of noxious gases or vapor. The source of the vapor in the kraft pulping process is thought to be primarily the emission of $SO_2$. Delignification using a preferred composition according to the present invention has, so far and to the best of the detection abilities available, not resulted in the production of $SO_2$.

Methanesulfonic acid (MSA), triethanolamine (TEOA) and hydrogen peroxide were blended with varying MSA, TEOA and hydrogen peroxide concentrations and reacted with the biomass (wood chips) overnight at ambient temperature and pressure conditions to assess the effectiveness of the variation on the molar ratios. Control tests were executed with the respective formulas with just kraft lignin or just cellulose added versus biomass. Commercially available lignin (Sigma-Aldrich; Lignin, kraft; Prod #471003) was utilized as a control in the testing. Commercially cellulose (Sigma-Aldrich; Cellulose, fibers (medium); Prod #C6288) was also utilized as a control in the testing.

The solid phase of each blend was filtered after a 20 h reaction time, rinsed with water and dried in an oven at 45° C. to a constant dry weight. All data is an average of triplicate runs. An effective formula would dissolve all lignin and leave the cellulose as intact and undamaged as possible. The results of the experiments are reported in Table 2 below.

TABLE 2

Recovery of solids (% of initial mass) after 20 h reaction time

| Formula Ratio | Wood (wt % remaining after reaction) | Lignin control (wt % remaining after reaction) | Cellulose control (wt % remaining after reaction) |
| --- | --- | --- | --- |
| 1:0:1 | 57.61 | 25.47 | 80.89 |
| 1:0:7 | 85.07 | 51.16 | 79.54 |
| 15:0:1 | 58.8 | 37.73 | 82.94 |
| 1:1:1 | 100 | 54.39 | 83.87 |
| 1:1:7 | 100 | 71.05 | 91.57 |

6.1. Batch Process Utilizing—Blend of MSA: $H_2O_2$ in a 1:1 Molar Ratio

A larger batch process was executed in order to evaluate and verify the compositions and process discussed previously executed on smaller volumes. For the preparation of a larger batch process, 548 g methanesulfonic acid (MSA) (70%) was mixed with 453 g hydrogen peroxide solution (29%) in a large beaker at ambient conditions (there was no cooling necessary due to minimal exothermic reaction). The molar blend ratio was 1:1. 50 g of unsized wood shavings (sawdust) was added and the mixture stirred at ambient conditions. Post 20 hours, the reaction mixture was transferred to a filter system with a 20 μm Teflon filter sheet and the residual solids dried at 45° C. for 12 hours. The solids yield when compared to the added biomass was 54.2%.

The hydrocarbon content of the resulting cellulose was determined to be 93.0% which is close to the Sigma-Aldrich cellulose lot #WXBC9745V—95.7% standard used as a comparison. The water content was determined to be 3.38% which is comparable to the Sigma-Aldrich cellulose lot #WXBC9745V—3% standard used as a comparison. The Kappa #=11, which means that the delignification was not quite complete but good enough for cardboard and utility paper. X-ray diffraction was carried out on the sample and indicated that apparent crystallinity was of 58.2% which is in line with our previously tested numbers and the commercial cellulose from Aldrich was measured to be 61.3%. Scanning electron microscopy was executed on the samples and indicated a very high fiber content.

According to another preferred embodiment of the present invention, the composition can be used to decompose organic material by oxidation such as those used in water treatment, water purification and/or water desalination. An example of this is the removal (i.e. destruction) of algae on filtration membranes. As such membranes are expensive, it is financially imperative that they be utilized for as long as possible. However, given the difficulty in removing organic matter which accumulates over time, new approaches are necessary to do so efficiently and with as little damage to the membrane as possible. Mineral acids are too strong and, while they will remove the organic matter, they will damage the filtration membranes. A preferred composition of the present invention remedies this issue as it is less aggressive than the mineral acids and, as such, will remove the organic contaminants in a much milder approach, therefore minimizing membrane damage.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. An aqueous acidic composition comprising:
   an alkylsulfonic acid;
   a peroxide; and
   a compound comprising an amine moiety selected from an alkanolamine,
   wherein said alkylsulfonic acid is present in the composition in an amount ranging from 20 to 65 wt % of the total weight of the composition;
   wherein said peroxide is present in the composition in an amount ranging from 1 to 30 wt % of the total weight of the composition; and
   wherein said alkylsulfonic acid and said peroxide are present in the composition in a molar ratio of no less than 1:1.

2. The composition according to claim 1, wherein said alkylsulfonic acid is selected from alkylsulfonic acids, wherein the alkyl in said alkylsulfonic acids is a linear or branched C1-C6 alkyl, and combinations thereof.

3. The composition according to claim 1, wherein said alkylsulfonic acid is selected from methanesulfonic acid, ethanesulfonic acid, propanesulfonic acid, 2-propanesulfonic acid, isobutylsulfonic acid, t-butylsulfonic acid, butanesulfonic acid, iso-pentylsulfonic acid, t-pentylsulfonic acid, pentanesulfonic acid, t-butylhexanesulfonic acid, and combinations thereof.

4. The composition according to claim 1, wherein said alkylsulfonic acid is methanesulfonic acid.

5. An aqueous composition comprising:
   alkylsulfonic acid;
   a peroxide; and
   a compound comprising an amine moiety selected from an alkanolamine,
   wherein said alkylsulfonic acid is present in the composition in an amount ranging from 20 to 65 wt % of the total weight of the composition;
   wherein said peroxide is present in the composition in an amount ranging from 1 to 30 wt % of the total weight of the composition; and
   wherein said alkylsulfonic acid and said peroxide are present in the composition in a molar ratio ranging from 1:1 to 15:1, wherein said composition is suitable for delignifying biomass or wood.

6. The composition according to claim 5, wherein said peroxide is hydrogen peroxide.

7. A method of delignifying biomass or plant material, said method comprising:
   providing said biomass or plant material comprising cellulose fibers and lignin; and
   exposing said biomass or plant material to a composition comprising:
     alkylsulfonic acid;
     a peroxide; and
     a compound comprising an amine moiety selected from an alkanolamine,
   wherein said alkylsulfonic acid is present in the composition in an amount ranging from 20 to 65 wt % of the total weight of the composition;
   wherein said peroxide is present in the composition in an amount ranging from 1 to 30 wt % of the total weight of the composition; and
   wherein said alkylsulfonic acid and said peroxide are present in the composition in a molar ratio ranging from 1:1 to 15:1;
   for a period of time sufficient to remove substantially all lignin present on said biomass or plant material.

8. The method according to claim 7, wherein said compound comprising an amine moiety has a molecular weight of less than 300 g/mol.

9. The method according to claim 7, wherein said alkanolamine is selected from monoethanolamine, diethanolamine, triethanolamine, and combinations thereof.

10. The method according to claim 7, wherein said alkanolamine is triethanolamine.

11. The method according to claim 7, wherein said peroxide is hydrogen peroxide.

12. The composition of claim 1, wherein said peroxide is hydrogen peroxide.

13. The composition according to claim 1, wherein said alkanolamine is selected from monoethanolamine, diethanolamine, triethanolamine, and combinations thereof.

14. The composition according to claim 1, wherein said alkanolamine is triethanolamine.

* * * * *